(12) United States Patent
Mendes et al.

(10) Patent No.: US 10,355,559 B2
(45) Date of Patent: Jul. 16, 2019

(54) DRIVE APPARATUS FOR A WHEEL OF A WORK MACHINE

(71) Applicant: Liebherr-Components Biberach GmbH, Biberach an der Riss (DE)

(72) Inventors: Marijo Mendes, Ulm (DE); Johann Lis, Riedlingen (DE); Stefan Duelli, Eberhardzell (DE); Roland Widmann, Unlingen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 180 days.

(21) Appl. No.: 15/029,174

(22) PCT Filed: Oct. 13, 2014

(86) PCT No.: PCT/EP2014/002759
§ 371 (c)(1),
(2) Date: Apr. 13, 2016

(87) PCT Pub. No.: WO2015/055295
PCT Pub. Date: Apr. 23, 2015

(65) Prior Publication Data
US 2016/0261171 A1 Sep. 8, 2016

Related U.S. Application Data

(63) Continuation of application No. PCT/EP2014/002759, filed on Oct. 13, 2014.

(30) Foreign Application Priority Data

Oct. 16, 2013 (DE) .................... 20 2013 009 151 U

(51) Int. Cl.
*H02K 3/24* (2006.01)
*H02K 7/14* (2006.01)
(Continued)

(52) U.S. Cl.
CPC ................. *H02K 9/04* (2013.01); *H02K 3/24* (2013.01); *H02K 5/20* (2013.01); *H02K 7/14* (2013.01);
(Continued)

(58) Field of Classification Search
CPC .. H02K 3/24; H02K 5/20; H02K 7/14; H02K 9/04; H02K 9/12; H02K 9/14
(Continued)

(56) References Cited

U.S. PATENT DOCUMENTS 2,873,393 A   2/1959   Baudry
3,643,119 A * 2/1972   Lukens .................... H02K 9/06
                                                  310/60 R
(Continued)

FOREIGN PATENT DOCUMENTS

DE        1059097 B      6/1959
DE        10317593 A1    11/2004
(Continued)

OTHER PUBLICATIONS

ISA European Patent Office, International Search Report Issued in Application No. PCT/EP2014/002759, dated Jul. 28, 2015, WIPO, 4 pages.

*Primary Examiner* — John K Kim
(74) *Attorney, Agent, or Firm* — McCoy Russell LLP

(57) ABSTRACT

The present invention relates to a drive apparatus for a wheel of a work machine, having an electric motor which comprises a rotor which is rotatably received in a stator and which is supported at bearing plates which are arranged at the end side and between which coil head spaces are provided for receiving coil heads, wherein a cooling apparatus for cooling of the stator and the rotor comprises at least one coolant path through the coil head spaces which is
(Continued)

suppliable with coolant from a peripheral side via a coolant inlet preferably provided at a peripheral side.

19 Claims, 1 Drawing Sheet

(51) Int. Cl.
    *H02K 9/04*     (2006.01)
    *H02K 5/20*     (2006.01)
    *H02K 9/12*     (2006.01)
    *H02K 9/14*     (2006.01)
    *B60K 7/00*     (2006.01)

(52) U.S. Cl.
    CPC ............... *H02K 9/12* (2013.01); *H02K 9/14* (2013.01); *B60K 7/0007* (2013.01); *B60K 2007/0092* (2013.01); *B60Y 2306/05* (2013.01)

(58) Field of Classification Search
    USPC .............................. 310/59, 61, 58
    See application file for complete search history.

(56) References Cited

U.S. PATENT DOCUMENTS

| | | | | |
|---|---|---|---|---|
| 3,675,056 A | * | 7/1972 | Lenz | H02K 9/20 174/DIG. 19 |
| 4,119,873 A | * | 10/1978 | Sakurai | H02K 9/26 310/227 |
| 4,442,371 A | * | 4/1984 | Utsunomiya | H02K 9/00 310/260 |
| 4,443,723 A | * | 4/1984 | Ohkubo | H02K 9/00 310/53 |
| 5,289,905 A | * | 3/1994 | Braschler | F16D 65/04 180/65.51 |
| 7,411,323 B2 | | 8/2008 | Pfannschmidt et al. | |
| 7,714,467 B2 | | 5/2010 | Pfannschmidt | |
| 2004/0150270 A1 | * | 8/2004 | Nagayama | H02K 1/32 310/61 |
| 2005/0206252 A1 | | 9/2005 | Georg et al. | |
| 2008/0017354 A1 | | 1/2008 | Neal | |
| 2008/0100159 A1 | * | 5/2008 | Dawsey | H02K 1/20 310/54 |
| 2010/0079946 A1 | | 4/2010 | Bharani et al. | |
| 2011/0127862 A1 | * | 6/2011 | Eichinger | H02K 1/20 310/61 |
| 2014/0125165 A1 | * | 5/2014 | Miyamoto | H02K 1/32 310/54 |
| 2014/0210286 A1 | * | 7/2014 | Guercioni | H02K 3/12 310/71 |
| 2014/0239756 A1 | * | 8/2014 | Hodowanec | H02K 1/20 310/55 |
| 2014/0285054 A1 | * | 9/2014 | Han | B60L 11/1803 310/201 |
| 2014/0292119 A1 | * | 10/2014 | Takahashi | H02K 3/12 310/54 |
| 2016/0261171 A1 | * | 9/2016 | Mendes | H02K 5/20 |

FOREIGN PATENT DOCUMENTS

| | | | | |
|---|---|---|---|---|
| DE | 10335141 A1 | | 3/2005 | |
| DE | 202008006887 U1 | | 8/2009 | |
| EP | 0416468 A1 | * | 3/1991 | ............. H02K 5/20 |
| EP | 1337029 A1 | | 8/2003 | |
| WO | 2005013461 A1 | | 2/2005 | |

\* cited by examiner

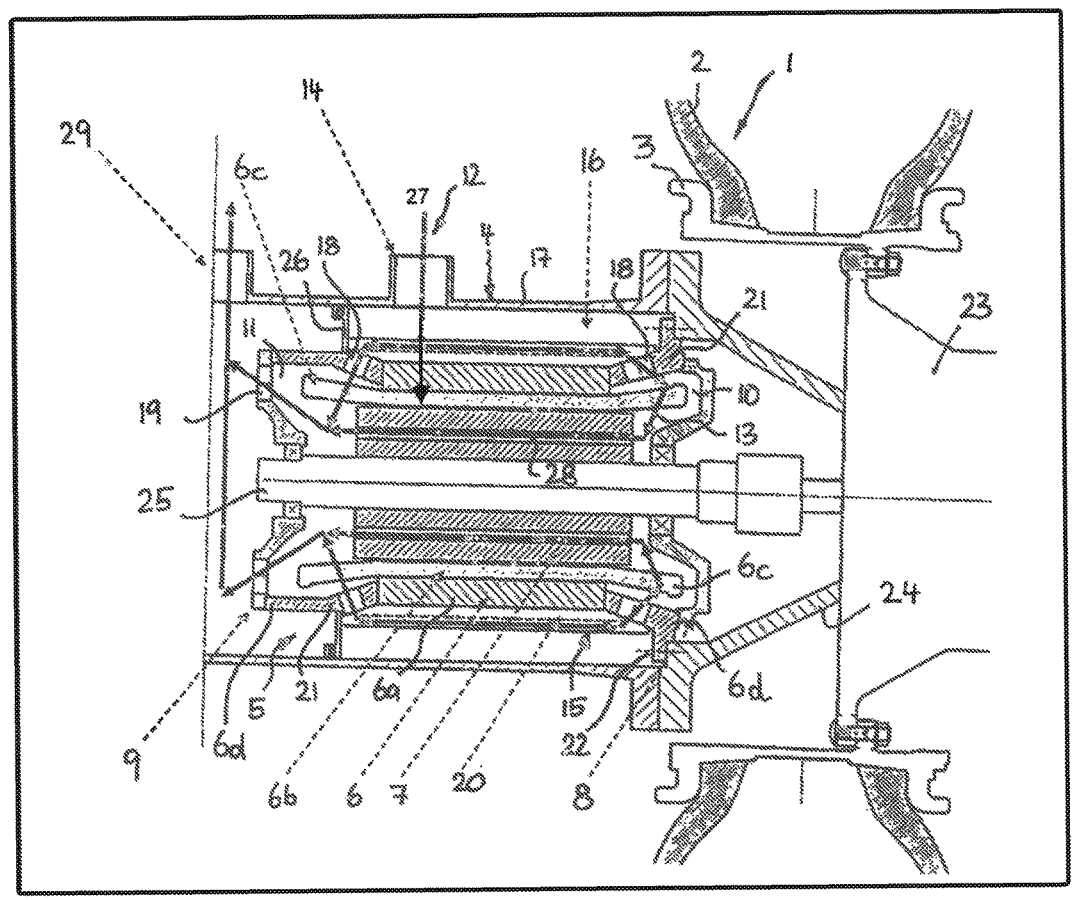

DRIVE APPARATUS FOR A WHEEL OF A WORK MACHINE

TECHNICAL FIELD

The present invention relates to a drive apparatus for a wheel of a work machine, having an electric motor which comprises a rotor which is rotatably received in a stator and which is supported at bearing plates which are arranged at the end side and between which coil head spaces are provided for receiving coil heads, wherein a cooling apparatus for cooling of the stator and the rotor comprises at least one coolant path through the coil head spaces which is suppliable with coolant from a peripheral side via a coolant inlet preferably provided at a peripheral side.

BACKGROUND AND SUMMARY

Electric motors of a certain construction type are as a rule cooled by a through-ventilation. In this respect, both self-ventilation with an impeller seated on a shaft of the electric motor and external ventilation with a separately driven and supplied fan can be implemented. The cooling by the coolant flow used for the cooling can be variably configured by the design of the electric machine and of the associated component, such as the wheel drive, to be driven. In this respect, as a rule, air or an air flow is used as the coolant, with other cooling gases or cooling fluids also generally being able to be considered.

In the case of electric motors for wheel drives of work machines such as construction machinery and/or mining machinery, for example in the form of trucks, dump trucks or mining devices, the through-ventilation of the electric wheel motors is implemented in two different manners in dependence on the design.

It has already been proposed, on the one hand, to introduce a cold air flow into the so-called axle box of the rear wheel drive of the dump truck, wherein the cold air flow flows along the stator and/or housing to the wheel side of the electric motor. The air enters through the openings in the wheel-side bearing plate into the interior of the motor, is divided between the bores in the stator and in the rotor and the air gap between the stator and the rotor and flows to the side remote from the wheel. The heated air there flows through openings in the bearing plate of the electric motor remote from the wheel.

The main problem in this embodiment in connection with drives for construction machinery or mining machinery such as dump trucks is the open design of the bearing plate at the wheel side. The transmission of the wheel drive, which is typically lubricated and cooled by oil, is typically installed behind the end face of the electric motor at the wheel side. If, however, leaks in the oil circuit or at the drive shaft seal occur here, the electric motor is contaminated by transmission oil. Oil droplets and also other contaminants are entrained into the inner space of the electric motor by the coolant flow which enters through the bearing plate at the transmission side into the interior of the electric motor. The contamination of the motor which has taken place sets it into a state which is typically irreparable, whereby simple damage in the oil circuit can bring about the complete failure of the electric drive component.

On the other hand, designs of electric motors are known in which the cooling air is supplied to the electric motor from the outer periphery in an almost central manner, i.e. at the center of the motor housing, and is expelled again over the bearing plates after deflections in the interior of the electric machine at both ends at the end side, cf. e.g. DE 103 17 593 A1. The electric motor can hereby admittedly be protected against the penetration of oil and other contaminant substances, but requires a housing which is used for the dividing of air. However, this increases the outer diameter and also the weight of the electric motor so that the electric motor is at least not usable for wheel drives of smaller work machines for space reasons and increases the unsprung masses noticeably so that such designs of electric motors can primarily be used for very large dump trucks.

Starting from this, it is the underlying object of the present invention to provide an improved drive apparatus of the initially named type which avoids disadvantages of the prior art and further develops the latter in an advantageous manner. A sufficient cooling should in particular be achieved without problems of contamination for the inner motor space and with a spatially compact design of the electric motor which is of lightweight construction such that the drive can also be used as a wheel drive for smaller dump trucks and similar construction machinery or mining machinery.

The named object is achieved in accordance with the invention by a drive apparatus for a wheel of a work machine, comprising: an electric motor with a rotor which is rotatably received in a stator, the rotor supported at bearing plates arranged at end sides and in which two coil head spaces are provided which are bounded by the stator, by the rotor, by a shaft of the electric motor and by the bearing plates or by a bearing plate, wherein a cooling apparatus for cooling the stator and the rotor comprises at least one coolant path through the coil head spaces which is supplied with coolant via a coolant inlet, wherein the cooling apparatus comprises a space surrounding the stator, and which is bounded at an outer peripheral side by a housing part spaced apart from the stator and having the coolant inlet, wherein the space communicates via communication openings provided at the ends of the stator with the coil head spaces, with one bearing plate being closed and free of a coolant passage and with the other bearing plate or the stator having at least one coolant outlet at the end of the motor at a side of the bearing plate such that coolant is conducted via the coolant inlet into the space, the coolant further conducted in the space propagating over an outer peripheral side of the stator, wherein the coolant is introduced through the communication openings into the coil head spaces and is drained through the at least one coolant outlet.

It is proposed in accordance with an advantageous embodiment of the present invention to cool the stator and its stator winding from an external peripheral side of the stator and, for this purpose, to utilize a space present about the electric motor or its stator for the installation environment of the electric motor such that the cooling air flow can also flow over the outer peripheral side of the stator. The coolant introduced into the inner motor space can flow out at an end side of the electric motor again via only one bearing plate, whereas the other bearing plate which preferably faces a transmission can be configured as closed. The space surrounding the stator is advantageously bounded at the outer peripheral side by a housing part which is spaced apart from the stator and in which the coolant inlet at the peripheral side is formed and can communicate at the inward peripheral side with the coil head space via communication openings which are provided at the ends of the stators in the bearing plates. With such an embodiment of the electric motor, the coolant can advantageously flow into the named space from a peripheral side via the coolant inlet, can be distributed there and can flow over the outer peripheral side of the stator to cool the stator and can flow through the communication openings into the coil head spaces in the interior of the electric motor to cool the rotor and the coil heads and can finally exit at the coolant outlet in the named one bearing plate.

An oil contamination of the inner motor space at the end side can be avoided by such a through-ventilation, but a sufficient cooling can simultaneously also in particular be achieved at the stator, with radial construction space being utilized or saved in the best possible manner by the utilization of a space which is already present per se about the electric motor toward the installation environment such that the drive apparatus is overall also suitable for smaller wheel drives at lighter dump trucks.

The coolant entering into one of the coil head spaces can in particular flow through bores or passages in the rotor and/or through the air gap between the stator and the rotor from the named coil head space at the side of the closed bearing plate into the coil head space having the at least one coolant outlet.

In an advantageous further development of the invention, the electric motor can itself be configured as without a housing, with the housing part bounding the named space at the outer peripheral side being able to be formed by a structural part of the installation environment of the electric motor. Depending on the installation situation of the electric motor, the named structural part can have different configurations, with the named structural part, however, not primarily serving the casing of the electric motor, but rather satisfying a different main functional purpose and already being present per se due to this other main purpose, for example for supporting the assembly to be driven by the electric motor.

On a use of the electric motor in a wheel drive of, for example, a dump truck, the named structural part can be an axial part of the wheel axle of the wheel which is driven by the electric motor, with the electric motor being received in the named axial part of the electric motor. If the electric motor is used for driving a tracked chassis, the named structural part can likewise be an axial part in which the electric motor is arranged, with the axial part being able to be associated in this case with a drive pinion or with the sprocket of the chain.

With the named casing-less design of the electric motor, the outer peripheral surface of the stator can in particular be arranged in an exposed manner with respect to the named space and can bound the inner periphery of the named space. The stator metal sheet stack and/or a stator winding arranged at the stator metal sheet stack can be adjacent in an at least partially exposed manner to the named space such that the cooling air can sweep directly over the stator in the space between the installation environment of the electric motor and the stator metal sheets or stator windings.

Furthermore, in an advantageous embodiment of the invention, the electric motor can be installed and fastened, without any interposition of a separate housing, via a stator end ring provided at a stator end and/or via the bearing plate connected thereto directly at the structural part of the installation environment, in particular the wheel axle housing. In a further development of the invention, the named stator end ring, which is arranged at the end side at the stator of the electric motor, can form a unit with the stator metal sheet stack having the stator winding and can have fastening points by means of which the electric motor is fastened to the named structural part. The named stator end ring can, for example, project a little beyond the stator metal sheet transversely to the axis of rotation of the electric motor and can have the named fastening points at the protruding collar section, for example in the form of axial passage bores which allow an axial screwing tight at the wheel to be driven or at a wheel axial part connected thereto.

To increase the cooling effect of the air flow flowing onto the stator through the aforesaid space, the stator can have, in an advantageous further development of the invention, cooling ribs at the outer periphery which project into the named space. The named cooling ribs can, for example, be formed by cut-outs or milled-out portions in the stator metal sheet stack. The aforesaid communication openings, through which the space communicates with the inner motor space or with the coil head spaces, can have different surfaces on the different sides of the stator or can be configured with different sizes in a further development of the invention, with the at least one communication opening advantageously being formed as larger at the side of the closed bearing plate than the at least one communication opening at the side of the other bearing plate. If a plurality of communication openings are provided at each side of the stator, all the communication openings, which are provided at one stator side, in particular at the side of the closed bearing plate, can together have a larger surface—viewed in total—than the other communication openings which are provided at the other side of the stator at the other bearing plate.

The named communication openings can in this respect in particular be configured as passing through the stator or the stator metal sheets such that the inner motor space or the coil head spaces communicate with the outwardly disposed space transversely to the axis of rotation of the electric motor.

The dimensional design of the named communication openings is in this respect in particular made such that more coolant flows into the inner motor space at the side of the closed bearing plate than at the side of the other bearing plate in which the coolant outlet is provided. The dimensional design of the passage openings can in this respect in particular be made such that around twice as much coolant flows into the Inner motor space or into the coil head space at the side of the closed bearing plate than at the side of the bearing plate having the coolant outlet.

To sufficiently cool the rotor in the interior of the electric motor, the named rotor can be provided with coolant passages or coolant bores through which the coolant can flow from the side of the closed bearing plate to the bearing plate having the coolant outlet opening.

The coolant supply via the aforesaid coolant inlet can generally take place at a different point of the named space, with the coolant inlet advantageously being able to be arranged at the peripheral side to be able to introduce coolant into the cooling space surrounding the stator from a peripheral side. The named coolant inlet can in this respect be arranged spaced apart from the axial end sections of the named space in a middle spatial section. In this respect, an exactly central arrangement of the coolant inlet can be provided at fifty percent of the length of the axial space. In an alternative, advantageous embodiment of the invention, the coolant inlet can be displaced from the named center a little toward the bearing plate which has the coolant outlet opening, for example arranged at approximately a third of the axial length of the space—starting from the bearing plate having the coolant outlet.

The named coolant inlet is advantageously arranged at an upper side of the named structural part.

The space which can be flowed through by the coolant and which surrounds the stator can be of different designs; it can, for example, only surround a part of the stator or can only extend along a sector of the stator. In an advantageous further development of the invention, the named space can form an annular space which surrounds the stator at all sides.

The electric motor can be connected to the wheel of the work machine to be driven and to the interconnection of a transmission to convert the speed of the motor shaft in the desired manner or in the desired step-up/step-down ratio into the speed of the wheel to be driven. The transmission in this respect is advantageously seated at the side of the bearing plate formed as closed.

The invention will be explained in more detail in the following with reference to a preferred embodiment and to associated Figs.

BRIEF DESCRIPTION OF FIGURES

FIG. 1 shows a longitudinal section through a drive apparatus for the wheel of a dump truck in accordance with an advantageous embodiment of the invention, wherein the electric motor and the structural part in the form of the axle box of the wheel drive surrounding the electric motor are each shown in section.

DETAILED DESCRIPTION

The named object is achieved in accordance with the invention by a drive apparatus for a wheel of a work machine, comprising: an electric motor with a rotor which is rotatably received in a stator, the rotor supported at bearing plates arranged at end sides and in which two coil head spaces are provided which are bounded by the stator, by the rotor, by a shaft of the electric motor and by the bearing plates or by a bearing plate, wherein a cooling apparatus 12 for cooling the stator and the rotor comprises at least one coolant path through the coil head spaces which is supplied with coolant via a coolant inlet, wherein the cooling apparatus 12 comprises a space surrounding the stator, and which is bounded at an outer peripheral side by a housing part 17 of the axle housing 4 which is spaced apart from the stator and having the coolant inlet, wherein the space communicates via communication openings provided at the ends of the stator with the coil head spaces, with one bearing plate being closed and free of a coolant passage and with the other bearing plate or the stator having at least one coolant outlet at the end of the motor at a side of the bearing plate such that coolant is conducted via the coolant inlet into the space, the coolant further conducted in the space propagating over an outer peripheral side 15 of the stator, wherein the coolant is introduced through the communication openings into the coil head spaces and is drained through the at least one coolant outlet.

It is proposed in accordance with an advantageous embodiment of the present invention to cool the stator and its stator winding from an external peripheral side of the stator and, for this purpose, to utilize a space present about the electric motor or its stator for the installation environment of the electric motor such that the cooling air flow can also flow over the outer peripheral side of the stator. The coolant introduced into the inner motor space can flow out at an end side of the electric motor again via only one bearing plate, whereas the other bearing plate which preferably faces a transmission can be configured as closed. The space surrounding the stator is advantageously bounded at the outer peripheral side by housing part 17 of the axle housing 4, which is spaced apart from the stator. In housing part 17 of the axle housing 4, the coolant inlet at the peripheral side of axle housing 4 is formed and can communicate at the inward peripheral side with the coil head space via communication openings which are provided at the ends of the stators in the bearing plates. With such an embodiment of the electric motor, the coolant can advantageously flow into the named space from a peripheral side via the coolant inlet, can be distributed there and can flow over the outer peripheral side of the stator to cool the stator and can flow through the communication openings into the coil head spaces in the interior of the electric motor to cool the rotor and the coil heads and can finally exit at the coolant outlet in the named one bearing plate.

As FIG. 1 shows, the wheel to be driven by the drive apparatus can be a chassis wheel, for example a rear wheel or a front wheel, of a self-propelled work machine, in particular a dump truck wheel 1 which can comprise a tire 2 fitted to a rim 3. In this respect, a single wheel can be driven, as FIG. 1 shows, or two wheels seated at a common axle, for example in the form of a twin-wheel arrangement, can also be driven by a common electric motor 5.

The wheel 1 to be driven can in this respect advantageously be supported at a wheel axle 24 which can have an elongate, hollow, for example approximately hollow-cylindrical axle housing 4, with the named axle housing 4 being able to be suspended in a manner known per se in a sprung and/or steerable manner at a chassis of the vehicle or of the work machine. The named axle housing 4 can in particular form a so-called axle box in which the electric motor 5 can be accommodated, as will still be explained in more detail.

The drive movement of the electric motor 5 can in this respect advantageously be transferred via a transmission 23 to the wheel 1, with the named transmission 23 being able to be arranged at an end side of the electric motor 5 so that an arrangement of electric motor 5 and transmission 23 disposed behind one another axially is produced. The motor shaft 25 of the electric motor 5 is rotationally fixedly connected to a transmission input shaft of the transmission 23 and can be arranged coaxially therewith. A transmission output element, for example in the form of a transmission housing, can be rotationally fixedly connected to the rim 3 and can in particular form the wheel hub to which the rim 3 can be fastened.

As FIG. 1 further shows, the electric motor 5 can itself be formed without a housing and can only be encased by the named axle housing 4 in the form of the axle box of the wheel suspension and can in particular be surrounded at the peripheral side.

The electric motor 5 can in this respect comprise in a known manner an outwardly disposed stator 6 in which a rotor 7 is rotatably received which is rotationally fixedly connected to the named motor shaft 25 and which is rotatably supported—via the named motor shaft 25—at bearing plates 8 and 9 which are arranged at the end side at the ends of the stator 6, cf. FIG. 1.

The stator 6 can in this respect comprise a stator metal sheet stack 6a at which a stator winding 6b can be arranged in a manner known per se whose coil heads 6c extend toward the bearing plates 8 and 9 and are accommodated in coil head spaces 10 and 11 screened by the named bearing plates 8 and 9.

Stator end rings 6d which can form a unit with the named stator metal sheet stack 6a can be attached to the end-side ends of the stator metal sheet stack 6a. The electric motor 5 can be fastened to the installation environment, in particular to the named axle housing 4, by one of these stator end rings 6d, in particular the stator end ring at the transmission side. The named stator end ring 6c can for this purpose comprise a fastening flange which projects transversely to the axis of rotation of the electric motor 5 and at which fastening points 22, for example in the form of screw bolt bores can be provided to be able to screw the stator end ring 6d tightly to a section of the axle housing 4 or to fasten it there in another manner.

Since the electric motor 5 is itself without a housing, the stator 6, in particular its stator metal sheet stack 6a, is arranged in an exposed manner at the outer periphery and is only directly surrounded by a hollow space 16 which extends between the axle housing 4 and the electric motor 5. The inner periphery of the axle housing 4 is larger than the outer periphery of the stator 6 so that an annular gap which defines the named space 16 is formed between the stator 6 and the axle housing 4.

The stator 6, in particular its stator metal sheet stack 6a, can comprise cooling ribs 20 at the outer peripheral side 15 which project into the named space 16, with the named cooling ribs 20 being able to extend in the axial direction and/or in the peripheral direction.

To cool the electric motor 5, a coolant inlet 14 is provided in the axle housing 4; it can be provided at an upper side of the axle housing 4 in the region of the named space 16 which extends around the stator 6 such that the coolant can be introduced radially into the named space 16. The named space 16 is in this respect bounded at the outer peripheral side by the axle housing 4 and at the inner peripheral side by the stator 6 or its metal sheet stack 6a. The named space 16 is bounded axially, on the one hand, by the radially projecting fastening flange of the bearing plate 8 and by a fastening section of the axle housing 4 connected thereto and, on the other hand, by a boundary web 26 which is of ring shape and which extends between the axle housing 4 and the stator 6, cf. FIG. 1.

The coolant introduced via the named coolant inlet 14 into the space 16 is first distributed into the named space 16 and flows from the coolant inlet 14 moved into the center to both axial ends of the space 16 and in so doing is simultaneously distributed in the peripheral direction about the stator 6. The stator 6 experiences a corresponding cooling by the sweeping over of the cooling ribs 20 at the outer periphery of the stator 6.

The coolant can flow, as shown by arrow 13, via communication openings 18 into the interior of the electric motor 5 at the axial end sections of the space 16. The named communication openings 18 are in this respect provided in end sections of the stator 6 and communicate the space 16 with the coil head spaces 10 and 11 which are bounded at the end side by the named bearing plates 8 and 9. The named communication openings 18 can in particular be disposed in the region of the coil heads 6c or can be arranged such that the coolant flowing in through the communication openings 18 flows around and/or through the named coil heads 6c.

The rotor 7 rotatably received in the stator 6 advantageously comprises coolant passages 28 which lead from an end-side end of the rotor 7 to its other end-side end and which can in particular extend through the rotor 7 in the axial direction.

The coolant flowing into the inner motor space can flow partly through the named coolant passages 28 in the rotor 7 and through the air gap 27 between the rotor 7 and the stator 6 and partly directly—namely that portion which flows directly into the left hand coil head space in accordance with FIG. 7—to the bearing plate 9 which is provided at the side of the electric motor 5 remote from the transmission 23 and which comprises at least one coolant outlet 19 through which the coolant can flow out of the inner motor space again. As FIG. 1 shows, the axle housing 4 can comprise a coolant outlet opening 29 at the peripheral side such that the heated coolant can also exit the axle housing 4 again.

While the named bearing plate 9 remote from the transmission 23 is open and comprises a coolant passage in the form of the coolant outlet 19, the other bearing plate 8 facing the transmission 23 is closed and sealingly closes the end side of the motor 5 facing the transmission 23. The named bearing plate 8 can in particular be sealingly connected to the stator end ring 6d at the axial front face 21 of the stator end ring 6d and can also be sealed with respect to the motor shaft 25 such that the coil head space 10 disposed behind the bearing plate 8 and thus the motor 5 is protected against oil entering from the transmission 23.

CROSS REFERENCE TO RELATED APPLICATIONS

The present application is a U.S. National Phase of International Patent Application Serial No. PCT/EP2014/002759, entitled "Driving Device," filed on Oct. 13, 2014, which claims priority to German Utility Model Patent Application No. 20 2013 009 151.7, filed on Oct. 16, 2013, the entire contents of each of which are hereby incorporated by reference in their entirety for all purposes.

The invention claimed is:

1. A drive apparatus for a wheel of a work machine, comprising: an electric motor with a rotor which is rotatably received in a stator, two stator end rings, each stator end ring provided at a respective axial end side of the stator, the stator end rings forming a unit with a stator metal sheet stack having a stator winding, the rotor supported at two bearing plates, each bearing plate arranged at a respective one of the axial end sides of the stator, wherein two coil head spaces are provided which are bounded by the stator, the rotor, a shaft of the electric motor, and the bearing plates, wherein a cooling apparatus for cooling the stator and the rotor comprises at least one coolant path through the coil head spaces which is supplied with coolant via a coolant inlet, wherein the cooling apparatus comprises a space surrounding the stator, and which is bounded at an outer peripheral side by a housing part formed by a wheel axle housing of the wheel of the work machine spaced apart from the stator and having the coolant inlet, wherein the space communicates via communication openings provided in the stator end rings, with one of the bearing plates being closed and free of a coolant passage and with the other bearing plate having at least one coolant outlet such that coolant is conducted via the coolant inlet into the space, the coolant further conducted in the space propagating over an outer peripheral side of the stator, wherein the coolant is introduced through the communication openings into the coil head spaces and is drained through the at least one coolant outlet, wherein the stator is configured without a motor housing,
wherein the housing part formed by the wheel axle housing bounding the space is formed by a structural part of an installation environment of the electric motor, and
wherein one of the stator end rings has fastening points for fastening the electric motor to the installation environment.

2. The drive apparatus in accordance with claim 1, wherein the coil head spaces comprise a coil head space at a side of the closed bearing plate and a coil head space at a side of the bearing plate having the at least one coolant outlet, wherein the coolant entering into the coil head spaces flows through bores in the rotor and/or through an air gap between the stator and the rotor, and further flows from the coil head space at the side of the closed bearing plate into the coil head space at the side of the bearing plate having the at least one coolant outlet.

3. The drive apparatus in accordance with claim 1, wherein the structural part is an axial part of a wheel axle in which the electric motor is received.

4. The drive apparatus in accordance with claim 1, wherein the outer peripheral side of the stator is arranged in an exposed manner in the space and bounds the space at an inner peripheral side of the stator.

5. The drive apparatus in accordance with claim 1, wherein cooling ribs projecting into the space are provided at the stator.

6. The drive apparatus in accordance with claim 1, wherein the coolant inlet is arranged in a middle section of the space respectively spaced apart from axial ends of the space.

7. The drive apparatus in accordance with claim 1, wherein the coolant inlet is arranged at an upper side of an axial housing supporting the wheel.

8. The drive apparatus in accordance with claim 1, wherein the electric motor is connected to a transmission at a side of the closed bearing plate.

9. The drive apparatus in accordance with claim 1, wherein the space extends at least substantially over a total axial length of the stator.

10. The drive apparatus in accordance with claim 1, wherein the wheel is a dump truck wheel.

11. A drive apparatus for a wheel of a work machine, comprising: an electric motor with a rotor which is rotatably received in a stator, two stator end rings, each stator end ring provided at a respective axial end side of the stator, the stator end rings forming a unit with a stator metal sheet stack having a stator winding, the rotor supported at two bearing plates, each bearing plate arranged at a respective one of the axial end sides of the stator, wherein two coil head spaces are provided which are bounded by the stator, the rotor, a shaft of the electric motor, and the bearing plates, wherein a cooling apparatus for cooling the stator and the rotor comprises at least one coolant path through the coil head spaces which is supplied with coolant via a coolant inlet, wherein the cooling apparatus comprises a space surrounding the stator, and which is bounded at an outer peripheral side by a housing part formed by a wheel axle housing spaced apart from the stator and having the coolant inlet, wherein the space communicates via communication openings provided in the stator end rings, with one of the bearing plates being closed and free of a coolant passage and with the other bearing plate having at least one coolant outlet such that coolant is conducted via the coolant inlet into the space, the coolant further conducted in the space propagating over an outer peripheral side of the stator, wherein the coolant is introduced through the communication openings into the coil head spaces and is drained through the at least one coolant outlet,
wherein the stator is configured without a motor housing,
wherein the housing part formed by the wheel axle housing bounding the space is formed by a structural part of an installation environment of the electric motor, wherein one of the stator end rings has fastening points for fastening the electric motor to the installation environment, and
wherein the coil head spaces comprise a coil head space at a side of the closed bearing plate and a coil head space at a side of the bearing plate having the at least one coolant outlet, wherein the closed bearing plate sealingly closes the coil head space at the side of the closed bearing plate.

12. A drive apparatus for a wheel of a work machine, comprising: an electric motor with a rotor which is rotatably received in a stator, two stator end rings, each stator end ring provided at a respective axial end side of the stator, the rotor supported at two bearing plates, each bearing plate arranged at a respective one of the axial end sides of the stator, wherein two coil head spaces are provided which are bounded by the stator, the rotor, a shaft of the electric motor, and the bearing plates, wherein a cooling apparatus for cooling the stator and the rotor comprises at least one coolant path through the coil head spaces which is supplied with coolant via a coolant inlet, wherein the cooling apparatus comprises a space surrounding the stator, and which is bounded at an outer peripheral side by a wheel axle housing part spaced apart from the stator and having the coolant inlet, wherein the space communicates with the coil head spaces via communication openings provided in the stator end rings, with one of the bearing plates being closed and free of a coolant passage and with the other bearing plate having at least one coolant outlet such that coolant is conducted via the coolant inlet into the space, the coolant further conducted in the space propagating over an outer peripheral side of the stator, wherein the coolant is introduced through the communication openings into the coil head spaces and is drained through the at least one coolant outlet, wherein the coil head spaces comprise a coil head space at a side of the closed bearing plate and a coil head space at a side of the bearing plate having the at least one coolant outlet, and wherein the communication openings between the space and the coil head space at the side of the closed bearing plate are larger than the communication openings between the space and the coil head space at the side of the bearing plate having the coolant outlet.

13. The drive apparatus in accordance with claim 12, wherein the communication openings between the space and the coil head spaces are dimensioned such that a ratio of a coolant quantity which enters into the coil head space at the side of the closed bearing plate to an air quantity which enters into the coil head space at the side of the bearing plate having the coolant outlet is between 1.5:1 and 3:1.

14. The drive apparatus in accordance with claim 12, wherein the coolant inlet is arranged in a middle section of the space respectively spaced apart from axial ends of the space.

15. The drive apparatus in accordance with claim 12, wherein the coolant inlet is arranged at an upper side of an axial housing supporting the wheel.

16. The drive apparatus in accordance with claim 12, wherein the electric motor is connected to a transmission at the side of the closed bearing plate.

17. The drive apparatus in accordance with claim 12, wherein the space extends at least substantially over a total axial length of the stator.

18. The drive apparatus in accordance with claim 12, wherein the wheel is a dump truck wheel.

19. The drive apparatus in accordance with claim 12, wherein the closed bearing plate sealingly closes the coil head space at the side of the closed bearing plate.

* * * * *